Aug. 19, 1969  N. E. WELLS  3,461,967
ROW FINDER FOR ROW CROP HARVESTERS
Filed March 14, 1966  2 Sheets-Sheet 1
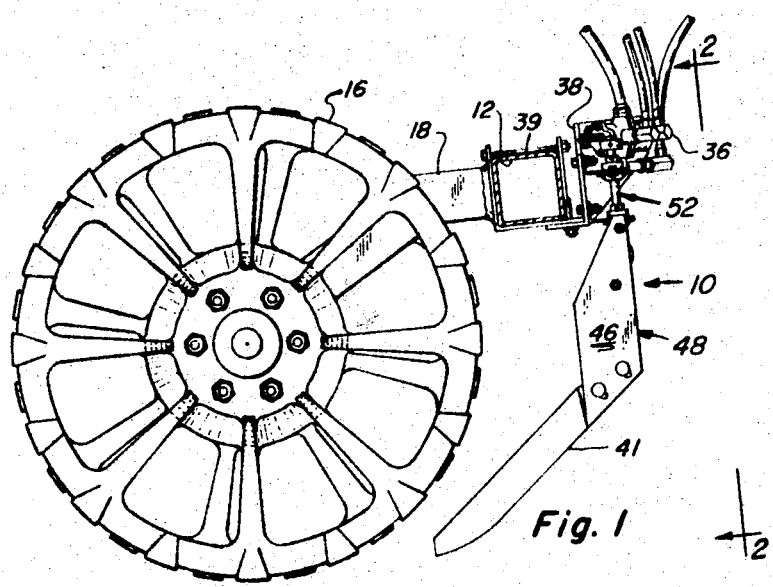
Fig. 1
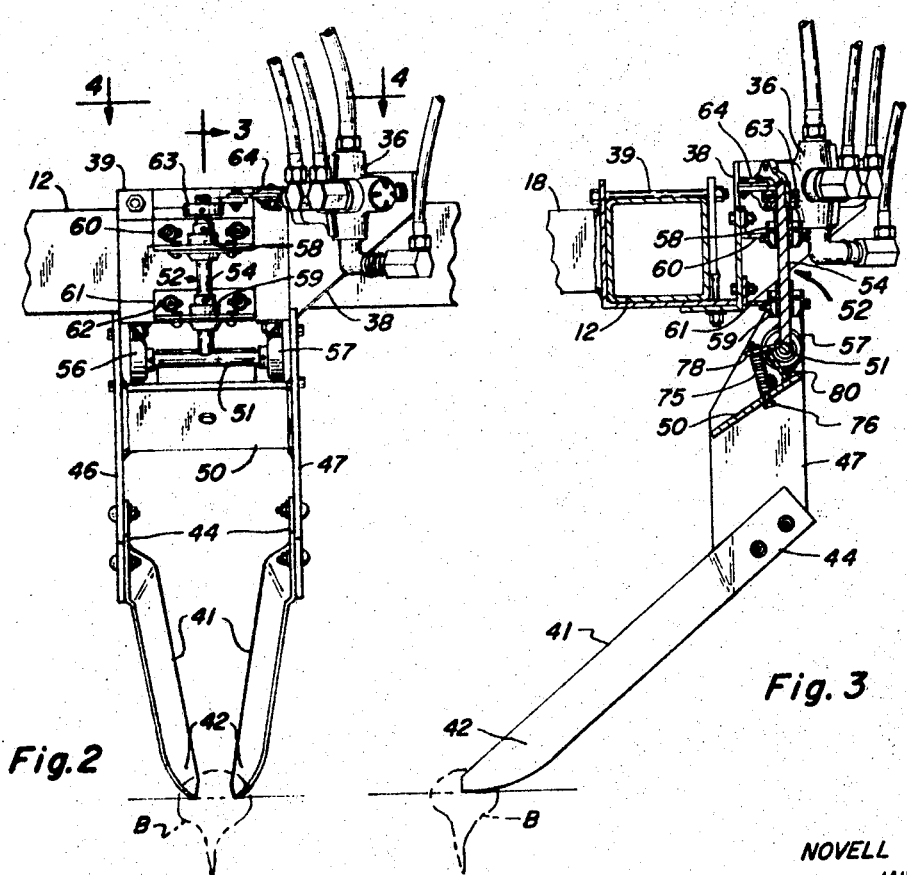
Fig. 2
Fig. 3
NOVELL E. WELLS
INVENTOR
BY
BUCKHORN, BLORE, KLARQUIST & SPARKMAN
ATTORNEYS Aug. 19, 1969  N. E. WELLS  3,461,967
ROW FINDER FOR ROW CROP HARVESTERS
Filed March 14, 1966  2 Sheets-Sheet 2

NOVELL E. WELLS
INVENTOR
BY
BUCKHORN, BLORE, KLARQUIST & SPARKMAN
ATTORNEYS

United States Patent Office 3,461,967
Patented Aug. 19, 1969

3,461,967
ROW FINDER FOR ROW CROP HARVESTERS
Novell E. Wells, 927 Ranch Road,
Boise, Idaho 83702
Filed Mar. 14, 1966, Ser. No. 534,205
Int. Cl. A01d 25/00, 33/00
U.S. Cl. 171—8                    5 Claims

ABSTRACT OF THE DISCLOSURE

A device for sensing misalignment of row crops and steering a harvester into alignment with the crop in response to such sensing. The device includes a pair of sensing fingers pivoted for vertical movement on the horizontal portion of an inverted T-shaped shaft which itself is mounted for horizontal movement about the vertical axis of the shaft. Rotative movement of the shaft is translated by a link to reciprocative movement of an actuator arm of a steering valve operatively connected to a harvester steering cylinder.

---

The present invention relates to apparatus for sensing misalignment of individual plants in a crop row and for steering the crop harvester in response to such sensings so that each individual plant in the row will be harvested. The invention relates more particularly to an improved row finder for beet and other row crop harvester.

Various types of row finders have been employed heretofore, all with the common object of steering the crop digging and lifting mechanism of a harvester into alignment with each individual plant in the crop row at the exact moment that such mechanism has traveled along the row to a position for picking up the plant so that every plant in the row will be harvested. Prior row finders have fulfilled the above objects with varying degrees of success, but none have been completely successful.

In some prior row finders the above object has been thwarted because the harvester is steered in response to one plant while the harvesting mechanism is preparing to pick up a different plant, thus often resulting in both plants and other plants between both plants being partially or completely missed by such mechanism.

In other types of row finders the steering portion of the device does not respond fast enough to the sensing portion thereof to align the pickup mechanism with the sensed plant before such mechanism has passed by such plant.

In my invention I eliminate the above causes of incomplete harvesting by positioning the plant sensing means immediately in front of and adjacent to the crop pickup mechanism so that the plant sensed is the next plant that the mechanism will pick up and by providing an improved and fast-acting linkage transmitting sensing movements of the sensing means directly and without lost motion to a harvester steering valve so that steering reaction to the sensing is fast enough to enable each sensed plant to be harvested immediately after being sensed.

It is therefore a primary object of the invention to provide a new and improved row finder that enables a row crop harvester to harvest every plant in a crop row.

Another, more specific object of the invention is to provide a new and improved row finder including a new and improved fast-acting linkage operatively connecting the sensing means of the finder to the harvester steering means so as to provide an immediate and direct response of the steering means to variations in sensings.

Still another specific object is to provide a new and improved row finder which enables the harvesting mechanism to be steered laterally into position for picking up every plant in a row at the exact time that the mechanism is in a longitudinal position along the row for picking up such plant.

A further specific object is to provide a row finder having a new and improved linkage between the sensing means and the steering means thereof which eliminates any need for an over-travel linkage and which substantially eliminates lost motion between the connected elements of the linkage.

Another object is to provide a new and improved row finder which is simple and inexpensive to construct, operate and maintain.

The above and other objects and advantages will become apparent from the following detailed description which proceeds with reference to the accompanying drawings wherein:

FIG. 1 is a longitudinal sectional view of a lower front end portion of a beet harvester including a pair of beet digging wheels and a row finder in accordance with the present invention;

FIG. 2 is a front view, on a slightly enlarged scale, of the row finder of FIG. 1;

FIG. 3 is a vertical sectional view on the same scale as FIG. 2, taken along the line 3—3 of FIG. 2;

Figure 5:
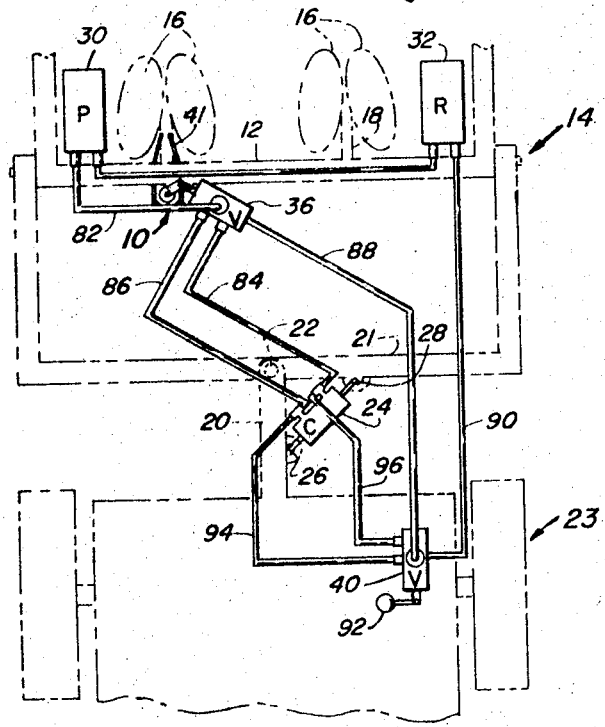
FIG. 5 is a schematic plan view of a hydraulic steering system for a harvester incorporating the row finder and showing a front end portion of a harvester and tractor in phantom.

With reference to FIGS. 1 and 5 of the drawings, a row finder unit 10 is mounted on a front cross frame member 12 of a beet harvester 14 having two pair of beet-digging wheels 16 supported by struts 18 which extend rearwardly from front cross frame member 12. The harvester has a tongue 20 pivoted at 22 to a cross frame member 21 and extending forwardly to a connection with a tractor 23.

Means are provided for steering the harvester down two beet rows at a time so that the pairs of digging wheels can be maneuvered into position for picking up each beet in their respective rows. The steering means includes a double-acting hydraulic steering cylinder 24 pivoted at 26 at the cylinder end to the tongue and pivoted at 28 at the piston rod end to cross frame member 21. A self-contained hydraulic system is carried on the harvester frame for operating the steering cylinder, such system including a pump 30, reservoir 32 and supply and return lines interconnecting the pump, cylinder and reservoir. Power for driving the pump is supplied through a power take-off shaft (not shown) from the tractor in a well known manner.

A four-way spool-type hydraulic steering valve 36 is rigidly attached to a mounting bracket 38 (see FIG. 4) which in turn is fastened to front cross frame member 12 by a clamping member 39 in a position alongside the remainder of row finding unit 10. Steering valve 36, and thus cylinder 24, is actuated in response to the beet-sensing means of the finder unit through a novel linkage about to be described. However, the steering cylinder may also be controlled independently of valve 36 through operation of a manual override valve 40 mounted in a position on the tractor convenient to the operator. However, manual valve 40 is not required and therefore need not be incorporated in the overall system.

Figure 4:
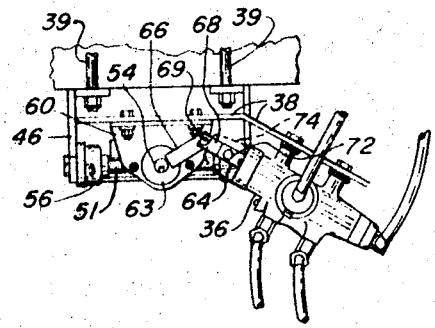
FIG. 4 is a top view of the row finder taken along the line 4—4 of FIG. 2.

Now with reference to the row finder unit itself, shown most clearly in FIGS. 2 through 4, such unit includes a pair of elongate metal beet-feeling shoes 41, the inside rear surfaces of which are tilted inwardly and inclined toward one another for engaging the opposite upper side portions of each beet B in a row. The pair of shoes is aligned longitudinally with one pair of digging wheels 16 and is positioned so that the rear tips thereof terminate at positions immediately in front of the lower ground-engaging portions of the digging wheels. A forward, vertical flange portion 44 of each shoe is rigidly bolted to a lower end portion of one of two opposed end plates 46, 47 which frm the opposite ends of a rocker member 48 which includes a cross member 50 rigidly joining together the two end plates. The opposite ends of a horizontal shaft portion 51 of a T-shaped pivot shaft 52 are connected to the upper portions of end plates 46, 47 by flange bearings 56, 57 so that relative movement between the rocker member and pivot shaft is permitted about the axis of horizontal shaft portion 51. However, flange bearings 56, 57 snugly receive horizontal shaft portion 51 and are rigidly mounted on the end plates so that no other relative movement is permitted between the pivot shaft and the rocker member.

T-shaped shaft 52 also includes an upright shaft portion 54 which is pivotally mounted in two vertically spaced apart pillow block bearings 58, 59 for movement about its upright axis only. Set screws fasten shaft portion 54 to the inner race of each bearing member to prevent any movement of the shaft relative to the inner race. Bearings 58, 59 are mounted in bearing plates 60, 61 which are in turn rigidly mounted to the same bracket 38 to which steering valve 36 is mounted. Bearing brackets 60, 61 have horizontal slots 62 which permit horizontal adjustment of the row finder unit, including shoes 41. From the foregoing it will be apparent that movement of the feeling shoes is permitted only about the horizontal axis of shaft portion 51 and the upright axis of shaft portion 54.

A collar 63 is keyed to the upper end of upright shaft 54, and set screws in the collar prevent any relative movement between the shaft and collar.

It will be noted that steering valve 36 is mounted laterally adjacent collar 63 and that such valve includes a reciprocative actuator arm 64 for actuating the valve spool.

A linkage means is provided between the collar and the actuator arm, as shown best in FIG. 4, for translating the rotative motion of the collar and shaft upon horizontal movement of the feeling shoes to rectilinear movement in the arm. Such linkage includes a first connector link 66 fixed as by welding at a first connection to the upper surface of collar 63 and a second connector link 68 forming a part of the reciprocative valve actuator means as an axial extension of actuator arm 64. Link 68 is connected at one end at a second connection spaced from the first connection by pin 69 to the outer end of connector link 66, and its opposite end extends into a slot 70 in actuator arm 64 and is connected to such arm by a pin 72. The necessary pin openings in links 66 and 68 and in arm 64 are preferably of a size just sufficient to receive pins 69 and 72 so that no appreciable lost motion occurs at the pivotal connections of each to the other. Links 66 and 68 are preferably made of a high carbon steel or other highly wear-resistant material, and pins 69 and 72 are also made of exceptionally hard, wear-resistant material. For example, a grade 8 cap screw has been found to serve well as pin 69. A rubber boot 74, shown in dashed lines in FIG. 4, normally fits over the actuating arm and the adjacent end of valve 36 to prevent dirt from entering the valve opening at such end.

From the foregoing it will be apparent that any slight lateral movement of feeling shoes 41 in aligning themselves with each individual beet in a row will result in the immediate and direct pivotal movement of upright shaft 54 about its axis, without any lost motion, so as to activate link members 66 and 68, causing a similar immediate movement of valve-actuating arm 64 to reposition the spool of valve 36 and thereby produce a controlled flow of pressure fluid through the steering valve to the steering cylinder, whereupon the cylinder will extend or retract to apply just the right amount of corrective steering to the harvester to enable the pairs of digging wheels to pick up the sensed beet and the corresponding beet in the laterally adjacent row.

It will also be apparent that vertical movement of the feeling shoes about the horizontal axis of the pivot shaft 51 will have no effect whatsoever on the steering linkage or steering valve. Such vertical movement of the shoes is permitted only to enable the shoes to adjust themselves to undulations in the ground surface. Shoes 41 are urged downwardly into engagement with the ground by a pair of coil springs 75, only one of which is shown in FIG. 3. The springs are retained by bolts 76 between the upper surface of cross member 50 and a spring anchor plate 78 extending rearwardly from horizontal shaft 51. An upright plate 80 is affixed to the upper surface of cross member 50 and extends in front of springs 75 and behind horizontal shaft 51 to shield the springs from dirt. It will be apparent from FIG. 3 that the enlarged heads of bolts 76 serve to limit downward movement of the feeling shoes.

OPERATION

In operation it is important that the feeling shoes be positioned in direct longitudinal alignment with one of the pairs of digging wheels 16 and immediately in front thereof so that each beet sensed by the feeling shoes will be the next beet to be picked up by the digging wheels. This will assure that the digging wheels will be steered into alignment with the beet to be picked up and will not be steered into alignment with any other beet until the beet sensed has been picked up. Referring to FIG. 5, when feeling shoes 41 swivel, for example, to the left to sense a beet laterally out of alignment to the left as viewed in such figure, upright pivot shaft 54 will immediately pivot counterclockwise to extend valve-actuating arm 64, thereby causing a controlled flow of pressure fluid from the pump through line 82 to valve 36 and from the valve through line 84 into the upper end (as viewed in FIG. 5) of steering cylinder 24 to effect a slight retraction of the cylinder and thereby swing the harvester in a clockwise direction about pivot axis 22 relative to the tongue, causing the harvester to move toward the left to align digging wheels 16 with the beet. Fluid from the opposite end of cylinder 24 will return to the reservoir through lines 86, 88 and 90. When the shoes move to the right, pressure fluid will enter cylinder 24 through line 86 to extend the same, and line 84 will serve as the return line. In operating manual valve 40, pressure fluid is supplied thereto by line 88 from valve 36, and then, depending on the positioning of handle 92, fluid is directed into the cylinder through either line 94 or line 96.

It has been found that with the foregoing arrangement the steering response is so immediate that a beet sensed with the feeling shoes immediately in front of the digging wheels will be picked up by such wheels even though the harvester may be traveling at a speed of from three to six miles per hour. This is achieved through the reduction of the number of pivot joints between the feeling shoes and the steering valve to a minimum, in this case to only two, and through the elimination for all practical purposes of any lost motion between the feeling shoes and the steering valve. The only opportunity for lost motion occurs at the pivotal connections between link members 66, 68 and arm member 64 and at the flange and pillow block bearings if such bearing should become worn. However, especially close tolerances are maintained at the pivotal connections, and highly wear-resistant materials should be used at the linkage connections. When bearings become worn, they should be replaced immediately to maintain the effectiveness of the system.

It is also important to point out that the foregoing described linkage eliminates any need of providing overtravel linkage with respect to the shoes and the valve-actuating arm because steering response to the shoes is so quick that the shoes never have an opportunity to travel horizontally beyond the limits of the movement of the valve-actuating arm.

Having described a preferred embodiment of the invention, it will be apparent to those skilled in the art that the same permits of modification in arrangement and detail. I claim as my invention all such modifications as come within the true spirit and scope of the appended claims.

I claim:
1. A row finder for a row crop harvester comprising:
a pair of feeling shoes for sensing opposite sides of each individual plant in a crop row,
a rocker member including a pair of laterally opposed upright end plates connected together by a cross member.
means rigidly mounting each of said feeling shoes to a different one of said end plates,
an inverted one-piece T-shaped pivot shaft member including a central upright shaft portion forming the stem of the T and a horizontal shaft portion extending laterally in opposite directions from the lower end of said upright shaft portion forming the head of the T,
a pair of bearing members, one on each of the opposite ends of said horizontal shaft portion connecting each of said opposite end plates to said horizontal shaft portion for permitting relative movement between said shaft portion and rocker member only about the axis of said horizontal shaft portion,
a bearing means mounting said upright shaft portion on the frame of said harvester and permitting movement of said shaft portion only about its vertical axis,
a steering valve mounted on said frame laterally adjacent an upper end portion of said upright shaft portion for controlling the flow of hydraulic pressure fluid to a harvester steering means and including a reciprocative valve-actuating arm,
a first rigid link member,
means rigidly connecting said first rigid link member to an upper portion of said upright shaft portion so that movement of said upright shaft portion about its axis effects a direct and corresponding movement of said first link member,
a second rigid link member,
and means pivotally connecting one end of said second link member to said first link member and pivotally connecting the opposite end of said second link member to said valve-actuating arm so as to prevent any appreciable lost motion between said shaft and said arm and so that relative pivotal movement only is permitted between said first link member, said second link member and said actuating arm,
whereby every movement of said feeling shoes about the axis of said upright shaft portion effects a direct and immediate corresponding rectilinear movement of said valve-actuating arm with substantially no lost motion between the various connected parts to effect an immediate steering response of said harvester.

2. Apparatus according to claim 1 including spring means extending between a rear extension of said horizontal shaft portion and said cross member urging said feeling shoes downwardly for engagement with the ground surface and permitting upward pivoting movement of said shoes about the axis of said horizontal shaft portion in response to variations in said ground surface.

3. Apparatus according to claim 1 wherein said bearing members on the opposite ends of said horizontal shaft portion are flange bearings and wherein said bearing means mounting said upright shaft portion includes a pair of vertically spaced apart pillow block bearing members.

4. Apparatus according to claim 1 wherein there are three or less pivot joints in the motion transmitting means for transmitting horizontal motion of said shoes between said shoes to said actuator arm.

5. Apparatus according to claim 1 wherein the means pivotally connecting together said first and second connector links includes a hardened pin of high carbon steel extending through openings in said links of a size just sufficient to receive said pin.

References Cited

UNITED STATES PATENTS 3,183,976   5/1965   Rollins _____ 171—8

ANTONIO F. GUIDA, Primary Examiner

U.S. Cl. X.R.

171—58